United States Patent [19]

Barrois et al.

[11] Patent Number: 5,748,408
[45] Date of Patent: May 5, 1998

[54] FLIGHT SLIDER FOR MAGNETIC RECORDING

[75] Inventors: Gérard Barrois, Le Fontanil; Marcel Dominiak, Grenoble; Jean-Marc Fedeli; Christian Pisella, both of Beaucroissant, all of France

[73] Assignee: Commissariat a l'Energie Atomique, Paris, France

[21] Appl. No.: 726,968

[22] Filed: Oct. 7, 1996

Related U.S. Application Data

[63] Continuation of Ser. No. 288,432, Aug. 11, 1994, abandoned, which is a continuation of Ser. No. 960,868, Oct. 14, 1992, abandoned.

[30] Foreign Application Priority Data

Oct. 30, 1991 [FR] France ................... 91 13424

[51] Int. Cl.$^6$ ........................ G11B 5/60
[52] U.S. Cl. ........................ 360/103
[58] Field of Search ................... 360/102, 103

[56] References Cited

U.S. PATENT DOCUMENTS

| | | | |
|---|---|---|---|
| 4,218,715 | 8/1980 | Garnier | 360/103 |
| 4,553,184 | 11/1985 | Ogishima | 360/103 |
| 4,636,894 | 1/1987 | Mo | 360/103 |
| 4,646,180 | 2/1987 | Ohtsubo | 360/103 |
| 4,670,806 | 6/1987 | Ghose | 360/103 |
| 4,673,996 | 6/1987 | White | 360/103 |
| 4,698,708 | 10/1987 | Lazzari | 360/103 |
| 4,802,042 | 1/1989 | Strom | 360/103 |
| 4,809,103 | 2/1989 | Lazzari | 360/103 |
| 4,837,648 | 6/1989 | Yamauchi | 360/103 |
| 4,837,924 | 6/1989 | Lazzari | 29/603 |
| 4,870,519 | 9/1989 | White | 360/103 |
| 4,870,521 | 9/1989 | Okabayashi | 360/103 |
| 4,901,185 | 2/1990 | Kubo et al. | 360/104 |
| 4,939,603 | 7/1990 | Inumochi | 360/103 |
| 5,010,429 | 4/1991 | Taguchi et al. | 360/103 |
| 5,062,017 | 10/1991 | Strom et al. | |
| 5,177,860 | 1/1993 | Yura et al. | 360/103 X |
| 5,267,109 | 11/1993 | Chapin et al. | 360/103 |

FOREIGN PATENT DOCUMENTS

| | | | |
|---|---|---|---|
| 0 262 655 | 4/1988 | European Pat. Off. . | |
| 0335732 | 3/1989 | European Pat. Off. | 360/103 |
| 0 361 658 | 4/1990 | European Pat. Off. . | |
| 2629247 | 9/1989 | France . | |
| 59-186172 | 10/1984 | Japan | 360/103 |
| 63-304419 | 6/1987 | Japan | 360/103 |
| 1-245480 | 9/1989 | Japan | 360/103 |

OTHER PUBLICATIONS

"An air bearing minimizing the effects of Slider Skew angle", IEEE Translations on Magnetics by G. Clifford and D. Heinz, vol. 25 No.5 Sep. 1989.

Patent Abstracts of Japan, vol. 10, No. 111 (P-451) (2168), Apr. 25, 1986, JP-A-60 242 548, Dec. 2, 1985.

Patent Abstarcts of Japan, vol. 1, No. 124 (E-055) (5268), Oct. 18, 1977, JP-A-52 056 917, Oct. 5, 1977.

IBM Technical Disclosure Bulletin, vol. 34, No. 4B, Sep. 1991, pp. 158–160, XP000189561, "Sliders with Well–Defined Undulation Patterns on the Abs for Improved Stiction and Flyability".

(List continued on next page.)

*Primary Examiner*—Craig A. Renner
*Assistant Examiner*—William J. Klimowicz
*Attorney, Agent, or Firm*—Oblon, Spivak, McClelland, Maier & Neustadt, P.C.

[57] ABSTRACT

A flight slider for magnetic recording. The slider according to the invention has at least one indentation to the rear of the relief or reliefs and the slider has utility for magnetic recording. The slider includes a support structure and at least one rail carried by the support structure, the rail defining a face which faces toward the recording medium, the rail having a front part and a rear part relative to the direction of motion of a moving recording medium. The head is located at the rear part of the at least one rail and the at least one rail has an indentation around its entire periphery.

14 Claims, 8 Drawing Sheets

OTHER PUBLICATIONS

Patent Abstracts of Japan, vol. 13, No. 460 (P–946) (3808), Oct. 18, 1989, JP–A–11 79 216, Jul. 17, 1989.

IBM Technical Disclosure Bulletin, vol. 26, No. 11, Apr. 1984, pp. 6195–6196, M.K. Hill, et al., "Dual Gap Head".

Research Disclosure, No. 321, Jan. 1991, p. 45, XP000163471, "Magnetic Head with Arrow–shaped Air Bearing Surface".

IEEE Transactions on Magnetics, vol. 26, No. 6, Nov. 1990, pp. 2972–2977, M. Ichinose, et al., "Single–Crystal Ferrite Technology for Monolithic Disk Heads".

Patent Abstracts of Japan, vol. 13, No. 239, (P–879), Jun. 6, 1989, & JP–A–64–43812, Feb. 16, 1989, Hosono Kazumasa, et al., "Thin Film Magnetic Head Slider".

Patent Abstract of Japan, vol. 6, No. 41, (P–106) (919), Mar. 13, 1982, & JP–A–56 159 865, Dec. 9,1981, Minoru Takahashi, "Thin Film Magnetic Head".

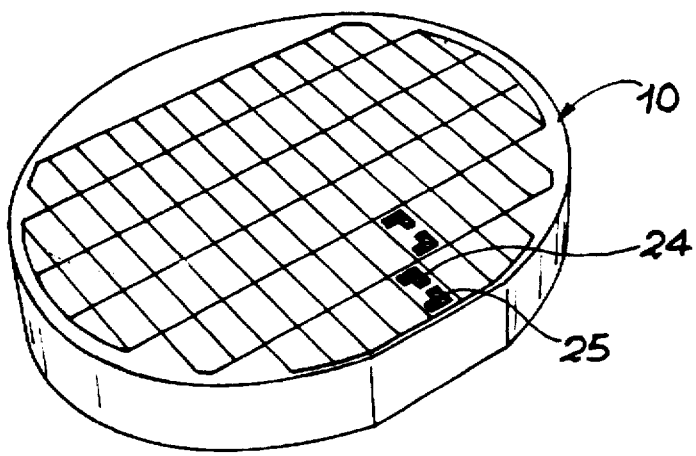
FIG. 1
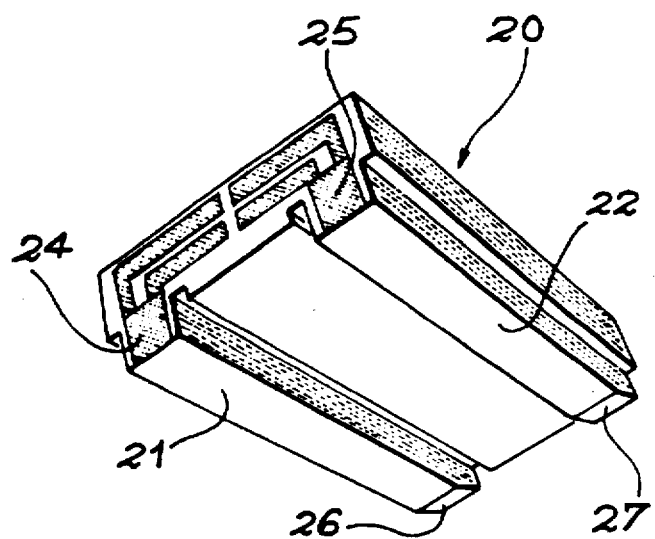
FIG. 2
FIG. 3
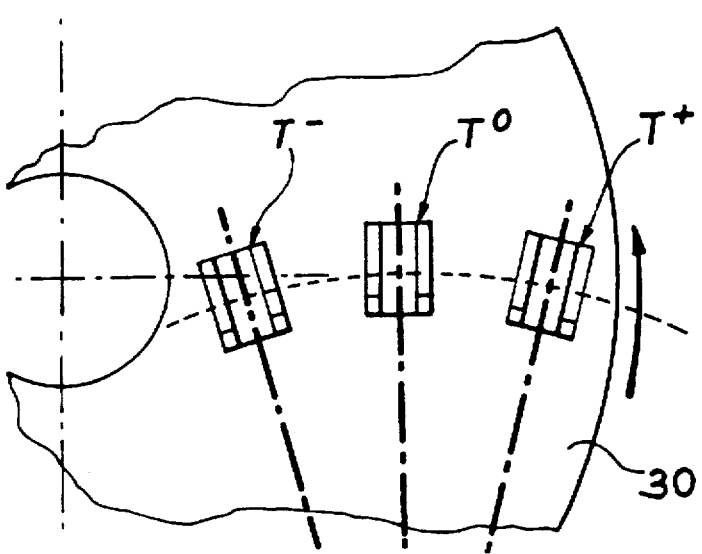

FLIGHT SLIDER FOR MAGNETIC RECORDING

This application is a Continuation of application Ser. No. 08/288,432, filed on Aug. 11, 1994, now abandoned, which was a continuation of application Ser. No. 07/960,868, filed on Oct. 14, 1992, now abandoned.

TECHNICAL FIELD

The present invention relates to a flight slider. An application thereof is in the reading and/or writing of information on a magnetic support.

DISCUSSION OF THE BACKGROUND

Magnetic recording devices in a very general manner comprise a recording support (disk, tape, etc.) and a reading and/or writing means constituted by a flight or movement slider.

A flight slider can have one or more rails in relief. Therefore the slider can have a monorail, or have two rails (having a so-called catamaran structure) or three rails (having a so-called trimaran structure). These rails or only certain of them are provided with a reading and/or writing head. The surface of the rails is turned towards the recording support and is subject to the pressure of the air when the support is rotated. It is this pressure which ensures the "flight" of the slider above the support.

Each rail in relief can support a magnetic head on the rear edge. These magnetic heads are deposited in thin film form, or are joined by adhesion. The length of the slider is generally determined by the thickness of the material in which the support is made and is e.g. alumina or ferrite and shaping takes place mechanically.

Thus, FIG. 1 shows a wafer 10 on which are deposited thin film heads 24, 25.

FIG. 2 shows a slider 20, in the case of a catamaran structure, with its two rails in relief 21, 22 and its two heads 24, 25. Chamfers 26, 27 are made at the front of each rail in relief, in order to permit the separation of the slider when the magnetic support reaches a certain rotation speed. This chamfer method is always used for flight sliders of the catamaran type, which are not made from silicon.

The access modes and times to a recording track have evolved rapidly in the past, so that it became necessary to provide devices adapting to the ever faster acceleration. In the case of the disk, the slider is no longer in this case in a position parallel to the track for all disk diameters and it can have a positive or negative angle as a function of the radius of the track used. This is shown in FIG. 3, where it is possible to see a hard disk 30 with a head T placed in three different positions T⁻, T°, and T⁺ with respect to the tangential direction of the track. The existence of an angular displacement between the longitudinal axis of the slider and the direction of the track will lead to lateral pivoting of the slider about the slider maintenance point (i.e. pivot point). This angular displacement will also lead to flight height variations. To obviate this disadvantage, the sides of the rails can be chamfered along the longitudinal axis.

Thus, FIG. 4 shows a catamaran-type slider 35 with two rails 36 and 37, their front chamfers 38, 39 and their lateral chamfers respectively 41, 42 for the rail 36 and 43, 44 for the rail 37. This type of slider is described in U.S. Pat. No. 4,673,996.

A variant to this procedure is shown in FIG. 5, where the longitudinal chamfers have been replaced by longitudinal indentations 51, 52 for the rail 50 and 55, 56 for the rail 54. This so-called transverse pressure contour or TPC procedure is described in U.S. Pat. No. 4,870,519. It gives a flight height stability for different writing and/or reading radii. However, it does not aim at solving the problems of flight height variations as a function of the speed increase in the case where there is no angular displacement at the same time. Moreover, it still requires the making of chamfers on the front edge of the release.

Flight sliders are also known in which a groove has been made transversely in each relief, as illustrated in FIG. 6 where said grooves are designated by reference numbers 61, 62.

Such a slider is described in the article by G. CLIFFORD and D. HENZE entitled "An Air Bearing Minimizing the Effects of Slider Skew Angle" in IEEE Transactions on Magnetics, vol.25, no.5, September 1989.

Flight sliders also exist which can be made from silicon and are illustrated by U.S. Pat. No. 4,698,708. The magnetic heads associated with these sliders are placed on the lower faces of the sliders and therefore are referred to as "planar heads". In order to improve the takeoff and landing of these sliders, the latter can have on the front face of the reliefs, indentations in the manner described in FR-A-2 629 247.

Although these devices (sliders made from silicon or not) are satisfactory in certain respects, they still suffer from disadvantages, because the operational constraints become more and more severe. Nowadays, the flight conditions of a slider must be perfectly controlled not only for zero angles, but also for positive or negative angles which may reach 20°. Moreover, a very considerable slider stability is required for very rapid access with recognition of the tracks. Moreover, the contact times must be reduced to a minimum in order to ensure a long life of the head-support pair. Finally, the limited flight heights encountered (approximately ¹⁄₁₀ micron) must be subject to small variations for speeds up to 15 m/s.

SUMMARY OF THE INVENTION

The object of the present invention is to obviate the disadvantages of the prior art and propose a flight slider with planar heads making it possible to obtain such high performance characteristics. To this end, the present invention recommends having an indentation at the rear of the relief rail, which will stabilize the rear portion of the rail.

In this connection it is pointed out that for conventional, non-planar heads, the magnetic element is located on the rear flank of the relief, so that access to the surface to the rear of the reliefs is not possible. However, for planar heads, more particularly on silicon, the magnetic elements are approximately 500 µm from the rear on the faces of the reliefs facing the support. Therefore it is of interest to set back the rear surface of the relief in order not to have a point lower than the magnetic head with respect to the support, whilst using said rear surface to create a depression. This depression increases with speed and makes it possible to limit the flight height variation. This depression also contributes to the determination of the inclination during flight. The Applicant has obtained good results for significant linear speed variations (the head still being tangential to the track). For a speed variation combined with an angle variation, the rear surface set back improves flight stability. For example, a width etching along the axis y of 40 to 500 µm can be carried out to the rear over a depth along the axis z of 0.2 to 4 µm.

The invention applies to any slider shape, i.e. monorail, catamaran or trimaran. If the slider has several rails in relief, at least one of these rails has an indentation at the rear. However, several or all the rails can have said rear indentation.

The arrangement according to the invention by which there is an indentation to the rear of the rail can be combined with known arrangements such as the presence of chamfers or longitudinal indentations (TPC) and/or a chamfer or indentation at the front. It is more particularly possible to have an indentation on the entire rail periphery. In this case, each indentation on the longitudinal sides and on the front cooperates with the rear indentation to fulfill certain functions. The freed surfaces on the longitudinal sides of the reliefs make it possible to avoid a lateral pivoting of the slider about its pivot point, as well as flight height variations when the slider direction forms an angle with the track. By modifying the lengths along an axis x of said surfaces of each longitudinal side of the relief, it is possible to obtain in the case of flight with an angle with respect to the track, a depression which increases with the speed and with the angle, which makes it possible to limit the elevation of the flight height along an axis z. The Applicant has observed that for lengths of 40 to 500 µm and depths of 0.2 to 4 µm, good stability was obtained in lateral displacements along the axis x and a variation of the flight height of the head not exceeding 20 nm. However, said good quality in the displacements will only be obtained for depths along the axis z of 0.2 to 4 µm. The surface freed at the front of the relief determines the takeoff and landing of the slider and the inclination during flight. The length along the axis y of said front zone is approximately 40 to 500 µm and the depth along an axis z of the indentation is 0.2 to 4 µm and preferably between 0.7 and 2 µm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 Shows a wafer with various thin film heads.

FIG. 2 Shows a flight slider with heads on rear flanks thereof.

FIG. 3 Illustrates the angle formed by a slider with the track, as a function of the radius of the latter.

THE PREFERRED DESCRIPTION OF EMBODIMENTS

Figure 4:
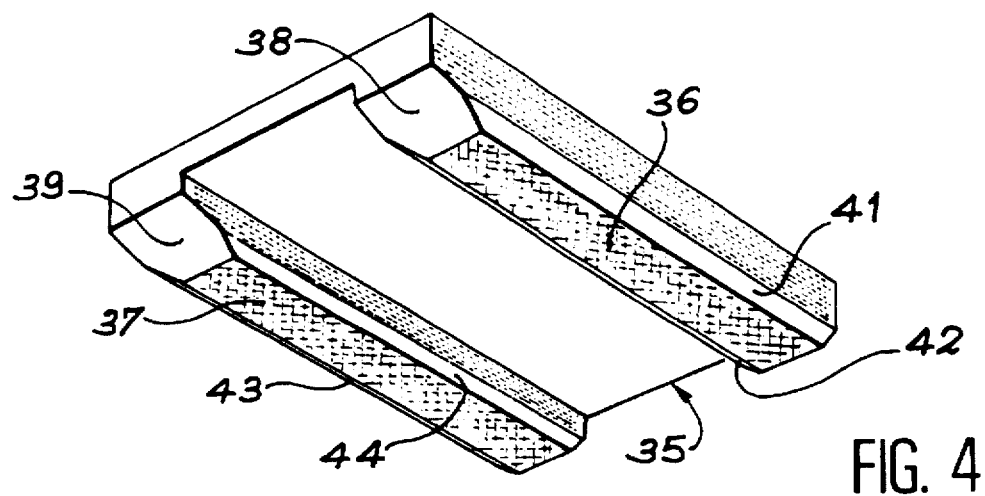
FIG. 4 Illustrates a slider with front chamfers and lateral chamfers.
Figure 5:
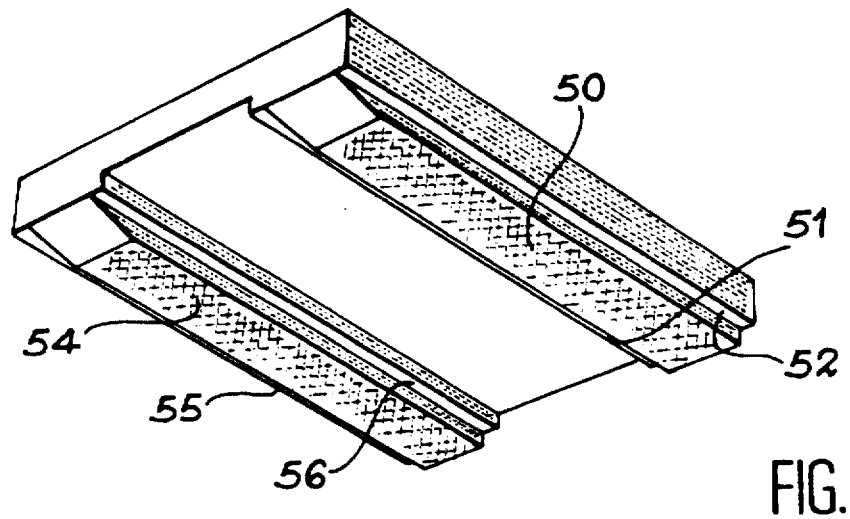
FIG. 5 Illustrates a slider with front chamfers and lateral indentations.
Figure 6:
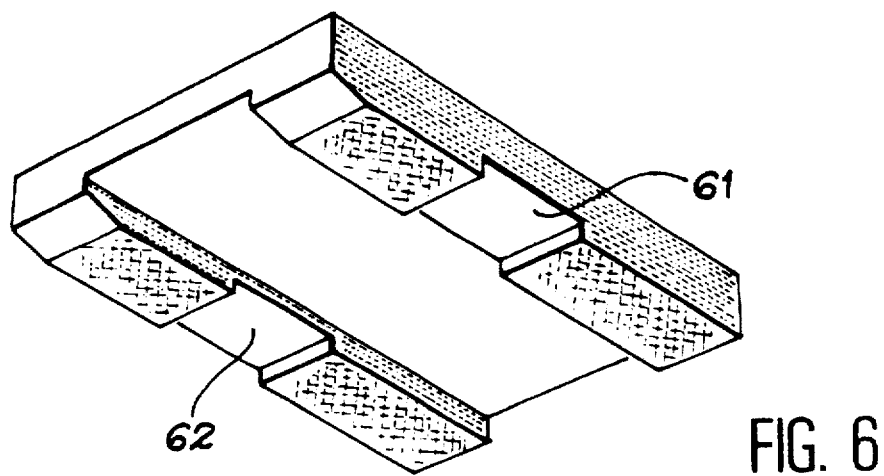
FIG. 6 Shows a slider with front chamfers and transverse grooves.
Figure 7:
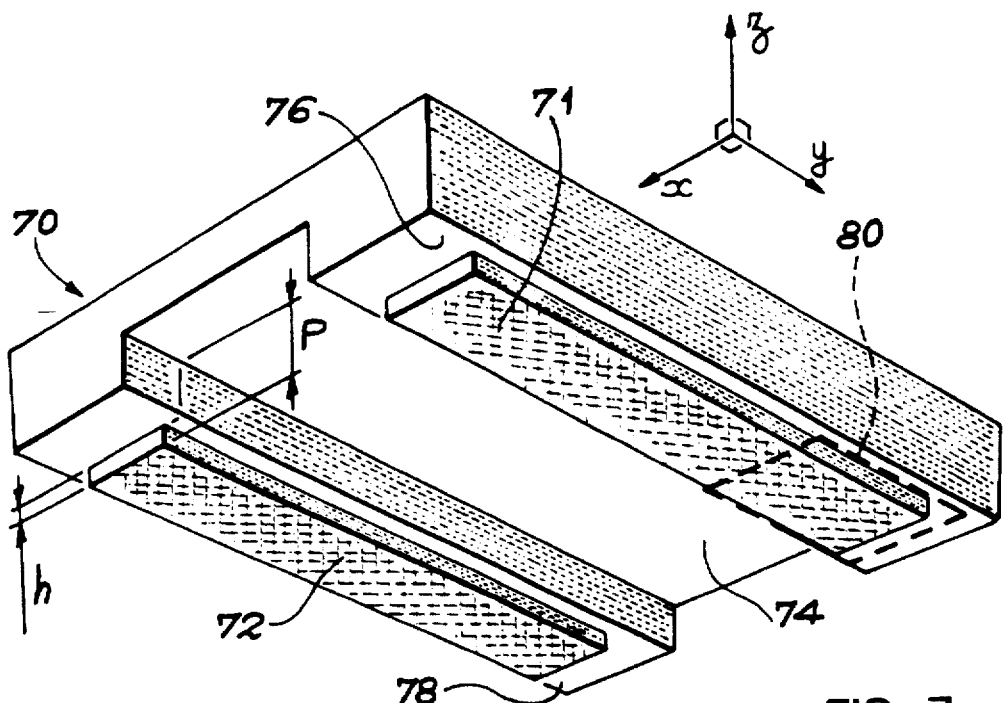
FIG. 7 Shows a flight slider according to the invention with a peripheral indentation around reliefs.

FIG. 7 shows the flight slider 70, which is in catamaran form and has two rails in relief 71, 72 separated by a recess 74. Around each relief 71, 72 is provided an indentation 76, 78 respectively, whose depth along the axis z is constant over the entire periphery of these reliefs. FIG. 7 shows that the central recess has along the z axis a depth P and the indentations along the axis z have a height h. The rear surface 200 of the slide, like the front surface, extends laterally of the slider in a single plane between opposite sides of the slider. FIG. 7 also indicates in broken line form under the reference 80, the position of the magnetic reading and/or writing head. Head 80 is here shown as being located in the support at the rear of and between the rail and the support. A magnetic head may be placed on only one of the reliefs or respectively on each relief. Opposite sides 170, 170 of the slide extend the entire length of the slide, as shown in FIG. 7, and a rear surface 180 of the slider extends the entire width of the slider between the opposite sides 170, 170.

FIGS. 8, 9, 10 and 11 show different embodiments of the slider according to the invention, in which the reliefs 71 and 72 have different shapes, particularly rounded (FIG. 10) and where the indentations are assymmetrical (FIGS. 8, 9, 10 and 11). The reliefs 71 and 72 are substantially perpendicularly oriented with respect to rear surface 200.

As shown, the rear surface 200 extends rearwardly of and between the rails. As a function of the use conditions, these different forms make it possible to control the depressions or pressures at the front, rear and on the sides of the slider, so as to optimize its flight stability.

In known flight sliders, the recess between the reliefs is approximately 70 to 100 µm deep along the axis z. The Applicant has found that the flight characteristics are not modified by depths reduced to approximately 15 µm. For lower values, more particularly between 2 and 10 µm, said recess can give rise to a depression during angular flights with respect to the track. This depression will also make it possible to check the flight height of the relief having the reading-writing head.

Thus, the invention also relates to a flight slider in which the reliefs are separated by a recess of depth P less than 15 µm. For certain applications, the value of the depth P of the recess between the reliefs can be identical to the height h of the indentation made on the periphery of the reliefs according to the invention. Then, the slider will only have a single surface set back with respect to the lower faces of the reliefs.

Figure 12:
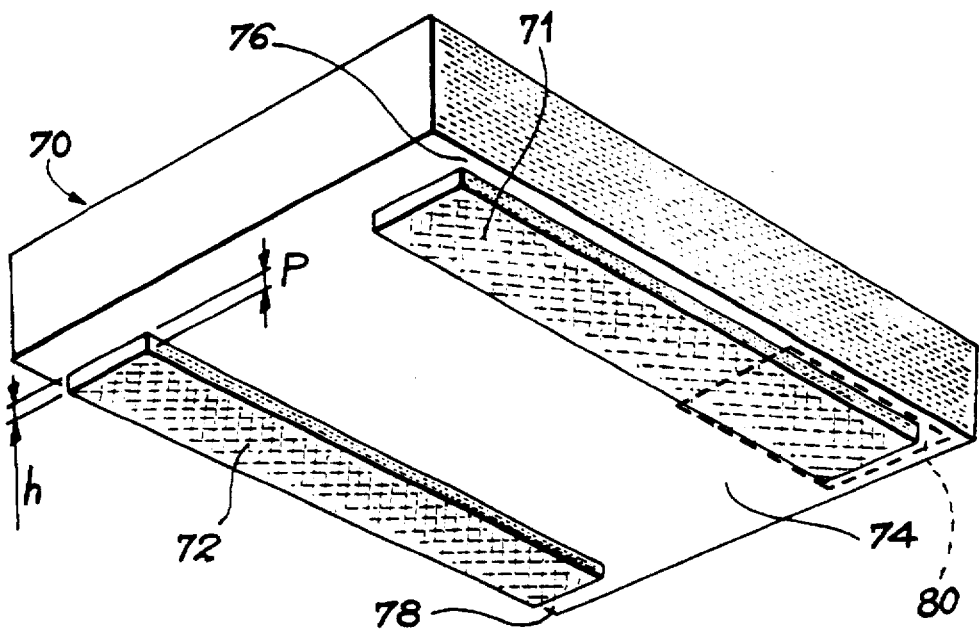
FIG. 12 Shows a special case where the central recess has as the depth the height of the peripheral indentation.
Figure 8:
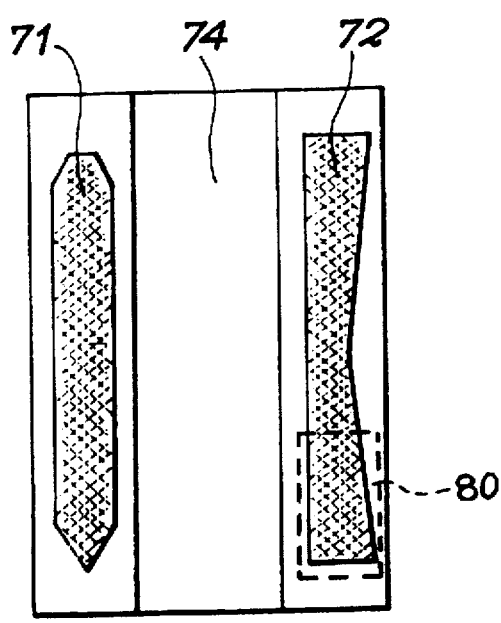
FIGS. 8, 9, 10 and 11 Show four embodiments, respectively, of the slider according to the invention.
Figure 9:
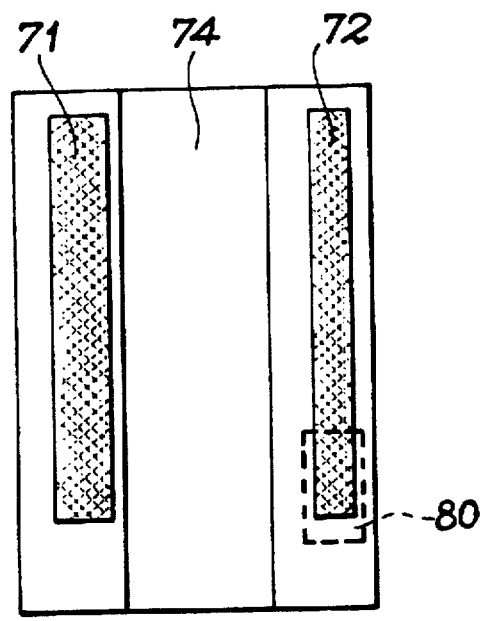
Figure 10:
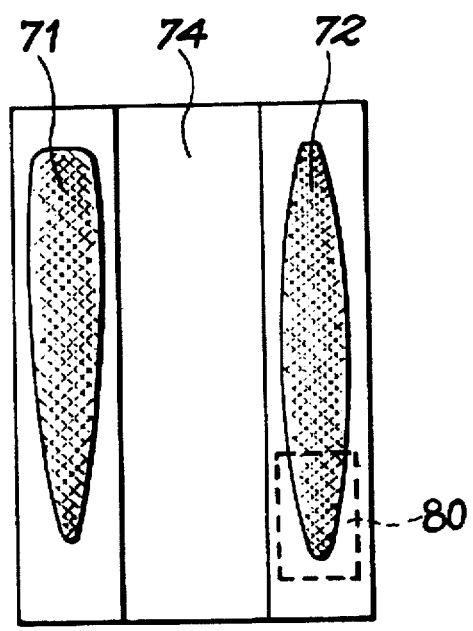
Figure 11:
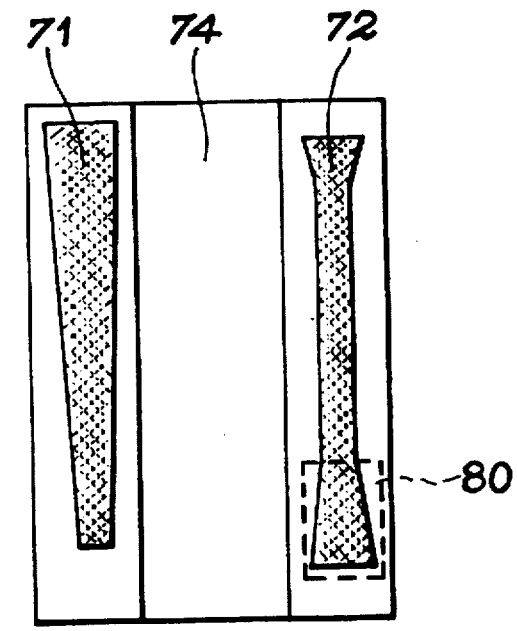

This is shown in FIG. 12, where the recess is designated 74 and the indentations respectively 76 and 78. The common depth (P, h) can be a few microns (e.g. 2 µm). Such small depths are more particularly possible in the case of collective etching, which makes it possible to obtain sufficient accuracy.

Figure 13:
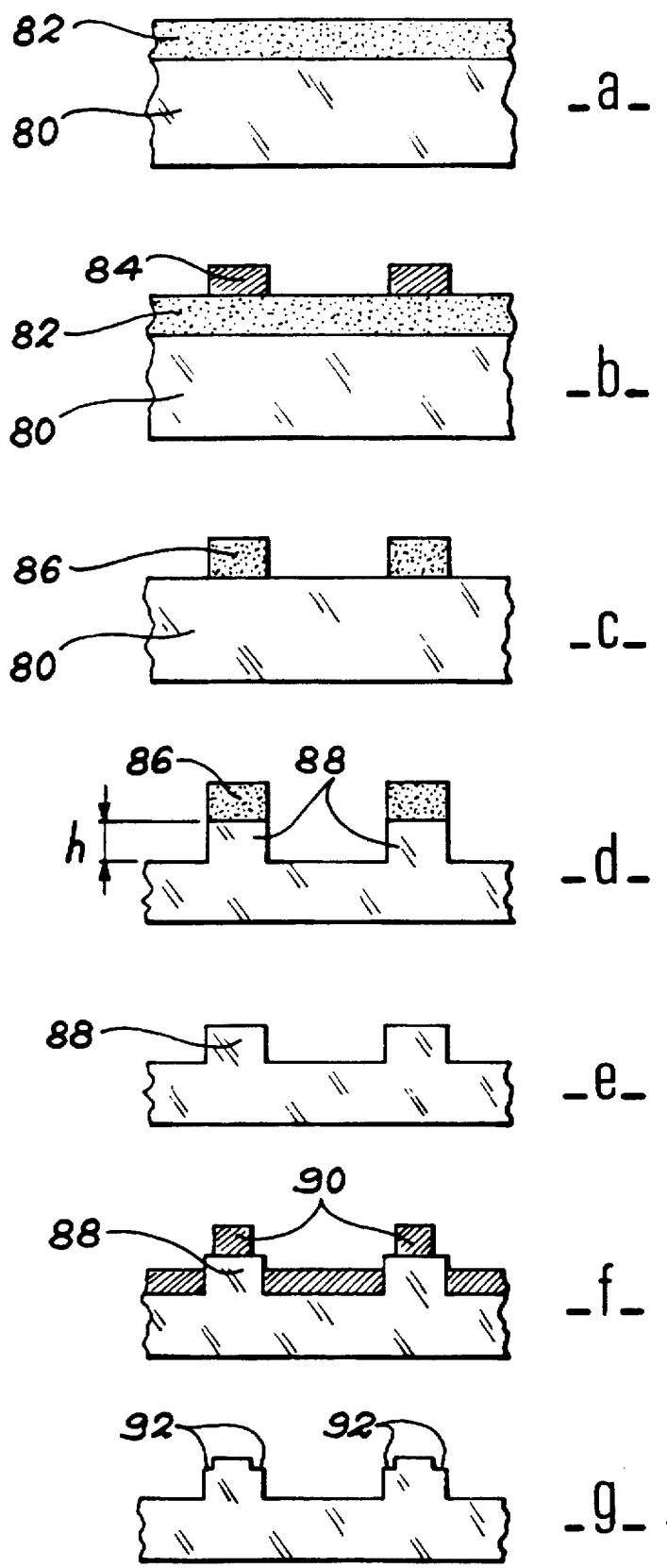
FIG. 13 Illustrates a process for construction of an embodiment of the slider according to the invention.

The flight slider described hereinbefore can be obtained by various photoetching operations. As a non-limitative example, FIG. 13 illustrates a process comprising the following operations:

a) on a wafer 80 (e.g. of silicon) is deposited a photosensitive resin 82 (part a);

b) this is followed by the irradiation of said resin through a mask defining the surface to be etched (part b);

c) following irradiation, development of the irradiated resin takes place in order to free the parts to be etched (resin reliefs 86) (part c);

d) this is followed by reactive ionic etching of the silicon in order to obtain the reliefs 88, said operation being carried out while checking the depth (h);

e) the resin is removed by a chemical process giving the reliefs 88;

f) by identical operations, a resin mask 90 is formed on the apex of the release 88 (part f) and optionally at the bottom of the recess to define the indentations to be made;

g) the periphery of the reliefs is etched to form the indentations 92 (part g) of depth between 0.2 and 4 μm (preferably between 0.7 and 2 μm.

When P=h, a single appropriately shaped mask 84 is sufficient for defining both the reliefs and the indentations (the recess coinciding with the indentations).

Figure 14:
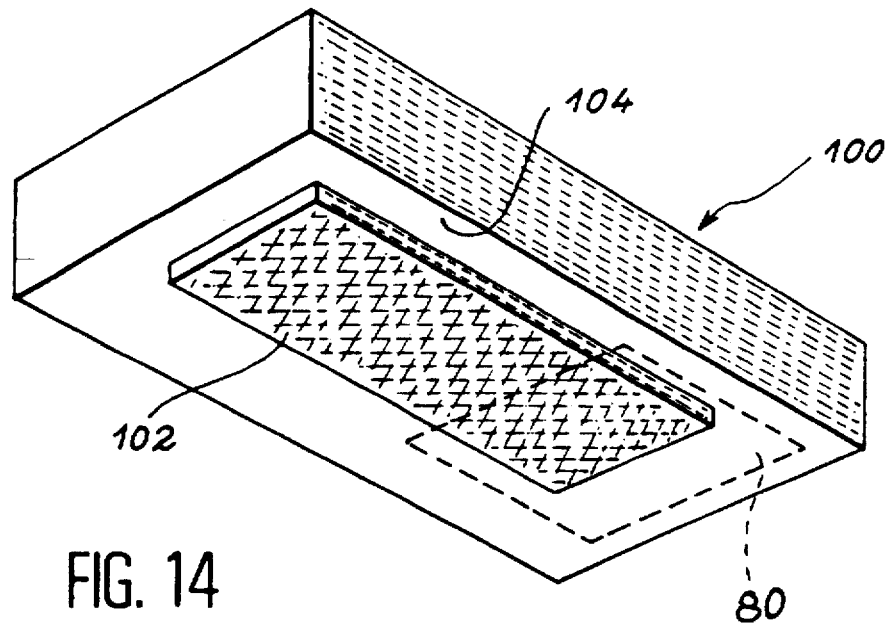
FIG. 14 Shows a monorail flight slider with a constant height peripheral indentation.

FIG. 14 shows a variant of the invention corresponding to a flight slider 100 having a single rail 102 with a constant height peripheral indentation 104.

Figure 15:
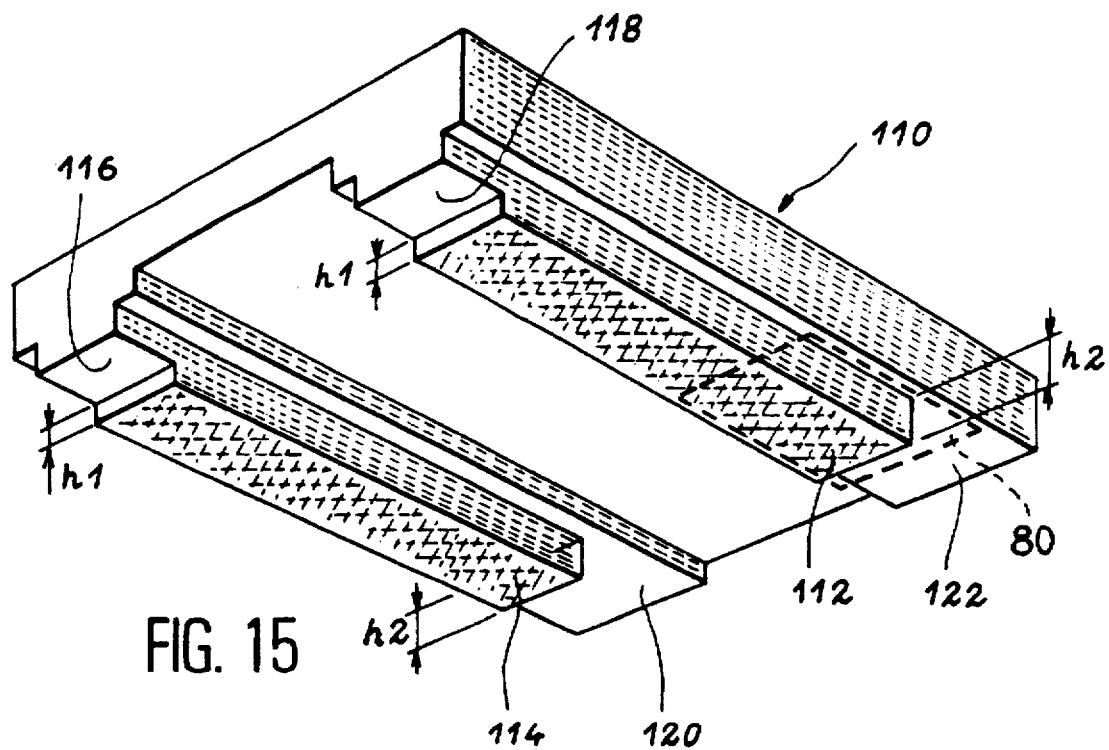
FIG. 15 Shows a catamaran-type flight slider with indentations of different heights.

FIG. 15 shows another variant corresponding to a catamaran-type flight slider 110 with two rails 112, 114 and peripheral indentations. However, the indentations at the front 116, 118 have heights differing from those of the indentations at the rear 120, 122 and on the edges. At the front, the height h1 can be 0.5 μm, whereas at the rear the height h2 can be 3 μm.

In the same way, it is possible to produce a head of this type with lateral indentations having a height different from that of the rear indentation.

Figure 16:
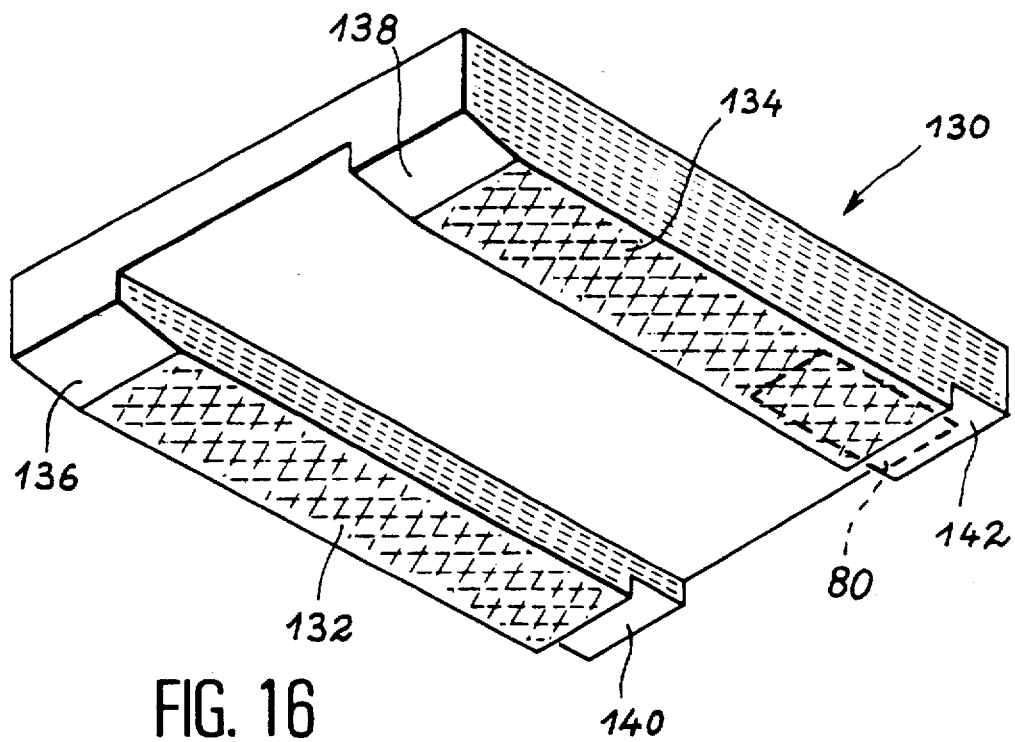
FIG. 16 Shows a catamaran-type flight slider with indentations to the rear and chamfers to the front.

FIG. 16 shows another variant, in which the flight slider 130 has two rails 132, 134 with front chamfers 136, 138 and rear chamfers 140, 142.

Figure 17:
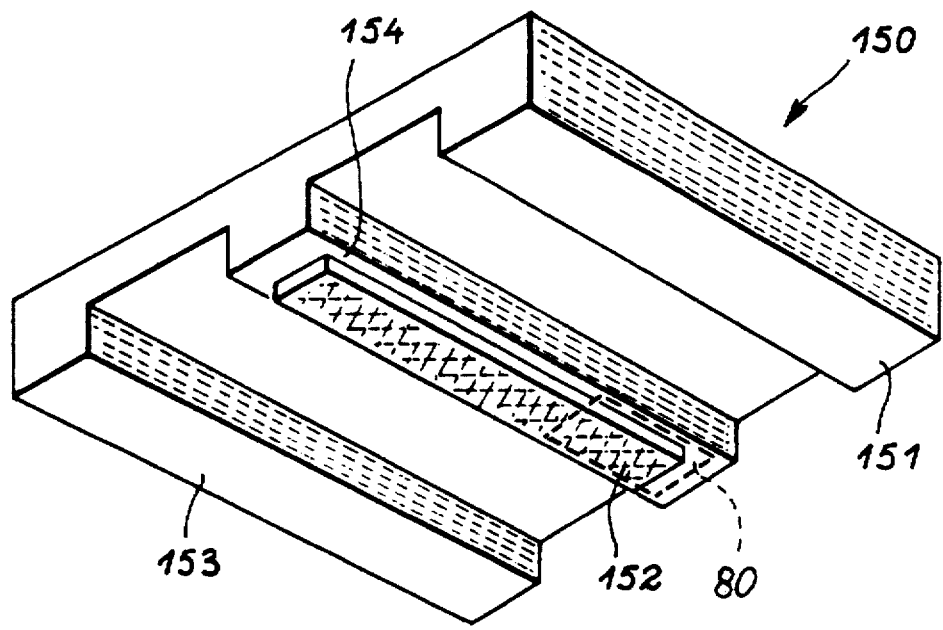
FIG. 17 Shows a trimaran-type flight slider with a rear indentation on only one of the rails.
Figure 18:
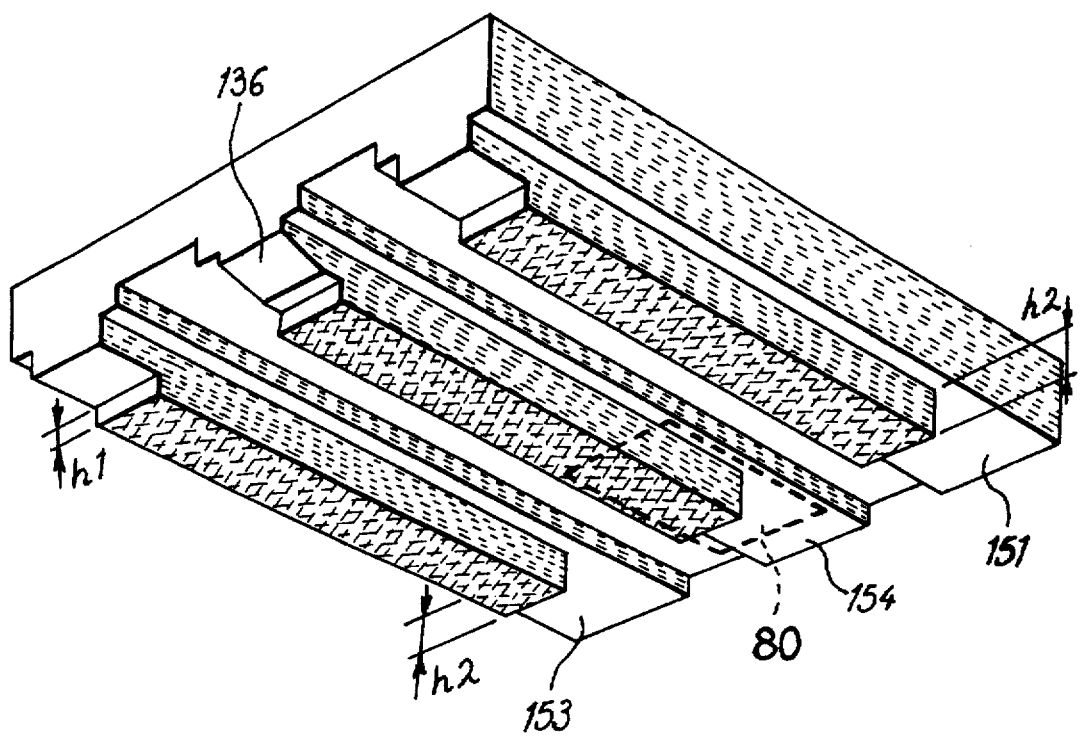
FIG. 18 shows a trimaran-type first slider like that shown in FIG. 17 but wherein the indentation at the front port has a first height and the indentation at the rear part has a second height, the second height differing from the first height.

Finally, FIG. 17 shows a trimaran-type flight slider 150 with three rails 151, 152, 153, whereof only the central rail 152 has a peripheral indentation 154 while FIG. 18 shows a central rail 152 with indentation height differences like that shown in FIG. 15.

We claim:

1. A slider assembly supporting a head in a flying relationship with respect to a moving magnetic recording medium, said slider assembly having:

a support structure including a laterally extending rear surface extending continuously in a single plane between opposite sides of the support structure wherein the opposite sides each extend along the entire length of the support structure, at least one rail carried by said support structure so as to be substantially perpendicular to said rear surface said rail defining a face of a substantially continuous width which faces toward said recording medium, said rail having a front part and a rear part relative to a direction of motion of said moving recording medium, said head comprising a planar head and being located at said rear part of said rail and between said face of said at least one rail and said support structure, said at least one rail having a step-shaped, etched indentation on said rear part which extends from a rear edge end of the rail to said rear surface of said support structure and around the entire periphery of said rail such that the step-shaped indentation includes a surface that is parallel to the opposite side surfaces of the support structure, a rear portion of the indentation being in proximity with said head wherein the height of the indentation is between 0.2 and 4 μm and wherein said rear surface extends rearwardly of said at least one rail and interconnects the opposite sides of the support structure as well as interconnects a first rear corner and a second rear corner of said support structure.

2. A slider assembly supporting a head in a flying relationship with respect to a moving magnetic recording medium, which comprises:

a support structure having a laterally extending rear surface extending continuously in a single plane between opposite sides of the support structure wherein the opposite sides each extend along the entire length of the support structure, and a first and second rail carried by said support structure so as to be substantially perpendicular to said rear surface, said first and second rails defining a face of a substantially continuous width which faces toward said recording medium, said first and second rails having a front part and a rear part relative to a direction of motion of said moving recording medium, said head comprising a planar head and being located at said rear part of said rail and between said face of at least one of said first and second rails and said support structure, said at least one of said rails having at least one step-shaped, etched indentation on said rear part which extends from a rear end edge of the at least one of said rails to said rear surface of said support structure and around the entire periphery of said at least one rail and in proximity with said head such that the step-shaped indentation includes a surface that is parallel to the opposite side surfaces of the support structure, wherein the height of the indentation is between 0.2 and 4 μm and wherein said rear surface extends rearwardly of and between said first and second rails.

3. A slider assembly supporting a head in a flying relationship with respect to a moving magnetic recording medium, said slider assembly including:

a support structure having a laterally extending rear surface extending continuously in a single plane between opposite sides of the support structure wherein the opposite sides each extend along the entire length of the support structure, and first and second rails carried by said support structure so as to be substantially perpendicular to said rear surface, said rails respectively defining two faces each of a substantially continuous width which face toward said recording medium, each of said rails having a front part and a rear part relative to a direction of motion of said moving recording medium, said head comprising a planar head located at the rear part of said two rails and between said faces of said two rails and said support structure, said rails supporting said head each having at least one step-shaped, etched indentation on said rear part which extends from a rear end edge of the rail to said rear surface of said support structure and around the entire periphery of each of said rails such that the step-shaped indentation includes a surface that is parallel to the opposite side surfaces of the support structure, said indentation on said rear end part being in proximity with said head wherein the height of the indentation is between 0.2 and 4 μm and wherein said rear surface extends rearwardly of and between said rails.

4. A slider assembly supporting two heads in a flying relationship with respect to a moving magnetic recording medium, said slider assembly including:

a support structure having a laterally extending rear surface extending continuously in a single plane between opposite sides of the support structure wherein the opposite sides each extend along the entire length of the support structure, and first and second rails carried by said support structure so as to be substantially perpendicular to said rear surface, said rails respectively defining two faces each of a substantially continuous width and which face toward said recording medium, each of said two rails having a front part and a rear part relative to a direction of motion of said moving recording medium, said two heads each comprising a planar head and being located at the rear part of and respectively between said face of said two rails and said support structure, said two rails each having at least a step-shaped, etched indentation which extends from a rear end edge of the rail to said rear surface of said support structure and which extends around the entire periphery of each of said rails such that the step-shaped indentation includes a surface that is parallel to the opposite side surfaces of the support structure, said rear end edge portion of the indentation being in proximity with said head wherein the height of the indentation is between 0.2 and 4 μm and wherein said rear surface extends rearwardly of and between said rails.

5. A slider assembly supporting a head in a flying relationship with respect to a moving magnetic recording medium, said slider assembly including:

a support structure having a laterally extending rear surface extending continuously in a single plane between opposite sides of the support structure wherein the opposite sides each extend along the entire length of the support structure, three rails carried by said support structure so as to be substantially perpendicular to said rear surface, said three rails respectively defining three faces each of a substantially continuous width which face toward said recording medium, each of said rails having a front part and a rear part relative to a direction of motion of said moving recording medium, wherein one of said three rails comprises a central rail located between the two remaining rails, said head comprising a planar head located at the rear part of and between said face of said central rail and said support structure, said central rail supporting said head having at least a step-shaped, etched indentation on said rear part which extends from a rear end edge of the rail to said rear surface of said support structure and around the entire periphery of said central rail such that the step-shaped indentation includes a surface that is parallel to the opposite side surfaces of the support structure, said step-shaped indentation on said rear part being in proximity with said head wherein the height of the indentation is between 0.2 and 4 μm and wherein said rear surface extends rearwardly of and between said rails.

6. A slider assembly supporting a head in a flying relationship to a moving magnetic recording medium, said slider assembly including:

a support structure having a laterally extending rear surface extending continuously in a single plane between opposite sides of the support structure wherein the opposite sides each extend along the entire length of the support structure, and at least two rails carried by said support structure so as to be substantially perpendicular to said rear surface, each of said rails defining a face of substantially continuous width which faces toward said recording medium, said rails having a front part and a rear part relative to a direction of motion of said moving recording medium, said head comprising a planar head and being located at the rear part of said rails and between one of said face of said rails and said support structure, said rails supporting said head having at least a one step-shaped, etched indentation on said rear part thereof which extends from a rear edge end of the rail to said rear surface of said support structure and which extends around the entire periphery of each of said rails such that the step-shaped indentation includes a surface that is parallel to the opposite side surfaces of the support structure, said step-shaped indentation on said rear part being in proximity with said head wherein the height of the indentation is between 0.2 and 4 μm, wherein said rails have a recess formed therebetween, said recess having a predetermined depth from said face of said rails and wherein said rear surface extends rearwardly of and between said rails.

7. A slider assembly according to claim 6 wherein said depth of said recess is equal in dimension to the height of said indentation at the rear part of said rail having an indentation at the rear part.

8. A slider assembly supporting two heads in a flying relationship with respect to a moving magnetic recording medium, said slider assembly including:

a support structure having a laterally extending rear surface extending continuously in a single plane between opposite sides of the support structure wherein the opposite sides each extend along the entire length of the support structure, and two rails carried by said support structure so as to be substantially perpendicular to said rear surface, each of said rails defining a substantially continuous face width which faces toward said recording medium, said rails having a front part and a rear part relative to a direction of motion of said moving recording medium, at least one of said two heads comprising a planar head and being located at the rear part of said rails and beneath said face of each of said rails, wherein said rails support said heads and each have at least one step-shaped, etched indentation on the rear part thereof which extends from a rear end edge of the rail to said rear surface of said support structure and around the entire periphery of said rails such that the step-shaped indentation includes a surface that is parallel to the opposite side surfaces of the support structure, said step-shaped indentation on the rear part being in proximity with said head, the height of the indentation is between 0.2 and 4 μm, said two rails have a recess formed therebetween and wherein said rear surface extends rearwardly of and between said rails.

9. A slider assembly according to claim 8 wherein the depth of said recess is equal in dimension to the height of said indentation on the periphery of said rails.

10. A slider assembly according to any of claims 1 to 5, wherein each rail having an indentation at the rear part has a chamfer at a front part thereof.

11. A slider assembly according to any of claims 1 to 5 wherein each rail having an indentation at the rear part also has an indentation at the front part.

12. A slider assembly according to claim 11 wherein said indentation at the front part has a first height and said indentation at the rear part has a second height, said second height differing from said first height.

13. A slider assembly according to any of claims 1 to 5, 6, 7, 8, 9 wherein the height of the indentation is between 0.7 and 2 μm.

14. A slider assembly supporting a head in a flying relationship with respect to a moving magnetic recording medium, said slider assembly including:
- a support structure including a laterally extending rear surface extending continuously in a single plane between opposite sides of the support structure wherein the opposite sides each extend along the entire length of the support structure, and
- at least one rail carried by said support structure so as to be substantially perpendicular to said rear surface, said rail defining a face of a substantially continuous face width which faces toward said recording medium, said rail having a front part and a rear part relative to a direction of motion of said moving recording medium,
- said head being a planar head and being located at said rear part of said at least one rail and between said face of said at least one rail and said support structure, said at least one rail having a step-shaped, etched indentation that extends around the entire periphery of said at least one rail such that the step-shaped indentation, includes a surface that is parallel to the opposite side surfaces of the support structure.

* * * * *